United States Patent
Nagata et al.

(10) Patent No.: US 12,379,219 B2
(45) Date of Patent: Aug. 5, 2025

(54) ROUTE SEARCH SYSTEM AND ROUTE SEARCH METHOD

(71) Applicant: TOYOTA JIDOSHA KABUSHIKI KAISHA, Toyota (JP)

(72) Inventors: Yu Nagata, Chofu (JP); Ai Miyata, Sakai (JP); Satoshi Komamine, Nagoya (JP); Syouta Komatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 18/357,693

(22) Filed: Jul. 24, 2023

(65) Prior Publication Data
US 2024/0035835 A1    Feb. 1, 2024

(30) Foreign Application Priority Data
Jul. 28, 2022    (JP) .................... 2022-120974

(51) Int. Cl.
G01C 21/34    (2006.01)
G01C 21/36    (2006.01)

(52) U.S. Cl.
CPC ..... *G01C 21/3461* (2013.01); *G01C 21/3492* (2013.01); *G01C 21/3676* (2013.01)

(58) Field of Classification Search
CPC .......... G01C 21/3461; G01C 21/3492; G01C 21/3676
See application file for complete search history.

(56) References Cited

U.S. PATENT DOCUMENTS

| | | | |
|---|---|---|---|
| 2012/0323485 A1 | 12/2012 | Mutoh | |
| 2013/0046456 A1* | 2/2013 | Scofield | G08G 1/096838 |
| | | | 701/117 |
| 2015/0345979 A1 | 12/2015 | Mutoh | |
| 2021/0056483 A1* | 2/2021 | Kajiwara | G08G 1/00 |

FOREIGN PATENT DOCUMENTS

JP    2013-003048 A    1/2013

* cited by examiner

*Primary Examiner* — Adnan M Mirza
(74) *Attorney, Agent, or Firm* — Oliff PLC (57) ABSTRACT

An information processing apparatus comprises a controller configured to execute: acquiring operation information that is information related to operation of a bus; and generating a running route for a first vehicle that is a light vehicle on the basis of the operation information.

14 Claims, 11 Drawing Sheets

BOARDING REQUEST

| USER ID | REQUEST ID | DESIRED BOARDING POINT | DESIRED BOARDING TIME | DESIRED ALIGHTING POINT | ... |
|---|---|---|---|---|---|
| U001 | R001 | ... | ... | ... | ... |

| VEHICLE DATA | | | | |
|---|---|---|---|---|
| VEHICLE ID | DATE AND TIME INFORMATION | ROUTE INFORMATION | POSITION INFORMATION | VEHICLE INFORMATION |
| V00001 | X | ... | ... | ... |

FIG. 5

| OPERATION DATA | | | | | | | | | |
|---|---|---|---|---|---|---|---|---|---|
| OPERA-TION ID | VEHICLE ID | DEPAR-TURE PLACE | WAYPOINT 1 | ARRIVAL TIME 1 | ... | DESTI-NATION | USER INFORMATION 1 | | USER INFORMATION 2 |
| | | | | | | | USER ID | RESERVA-TION ID | BOARDING PLACE | ALIGHTING PLACE | ... | |
| S00001 | ... | ... | ... | ... | ... | ... | ... | ... | ... | ... | ... | ... |

ROUTE SEARCH SYSTEM AND ROUTE SEARCH METHOD

CROSS REFERENCE TO THE RELATED APPLICATION

This application claims the benefit of Japanese Patent Application No. 2022-120974, filed on Jul. 28, 2022, which is hereby incorporated by reference herein in its entirety.

BACKGROUND

Technical Field

The present disclosure relates to a route guidance system.

Description of the Related Art

There is available a technique for generating a running route suitable for bicycles.

In this relation, for example, Japanese Patent Laid-Open No. 2013-003048 discloses an information processing apparatus capable of making a route search on the basis of the ease of running of bicycles.

SUMMARY

An object of the present disclosure is to search for a safer running route for light vehicles.

The present disclosure in its one aspect provides an information processing apparatus comprising a controller configured to execute: acquiring operation information that is information related to operation of a bus; and generating a running route for a first vehicle that is a light vehicle on the basis of the operation information.

The present disclosure in its another aspect provides an information processing method comprising: a first step of acquiring operation information that is information related to operation of a bus; and a second step of generating a running route for a first vehicle that is a light vehicle on the basis of the operation information.

Other aspects include a program for causing a computer to execute the above-described method or a computer-readable storage medium non-transitorily storing the program.

According to the present disclosure, it is possible to search for a safer running route for light vehicles.

DESCRIPTION OF THE EMBODIMENTS

An on-demand bus which is operated on the basis of a request from a user is known. The on-demand bus is a transportation system in which neither an operation route nor stops are fixed, and a route and a boarding and alighting point are dynamically set on the basis of requests from a plurality of users.

The presence of a bus may interfere with running safety for light vehicles including bicycles. For example, if a bicycle passes along a roadway, a large car passing the bicycle may impose a safety risk. If a bus is at a stop, particular attention needs to be given to avoidance of contact with passengers boarding and alighting and an oncoming car in order for the bicycle to safely pass the bus.

It may be preferable to guide the bicycle to a route with a lower bus running frequency or stopping frequency to reduce the risk, which has not been feasible in the related art.

An information processing apparatus according to the present disclosure solves the above-described problem.

An information processing apparatus according to a first aspect of the present disclosure includes a controller configured to execute acquiring operation information that is information related to operation of a bus and generating a running route for a first vehicle that is a light vehicle on the basis of the operation information.

"The light vehicle" refers typically a vehicle without a motor, such as a bicycle.

The bus may be a fixed-route bus or may be an on-demand bus which is operated on demand on the basis of a request from a user.

The on-demand bus is a ride-sharing automobile which is operated in response to a request from a user. In the present embodiment, an operation route and boarding and alighting points for the on-demand bus are not determined in advance and are dynamically determined in response to a request from a user.

The information processing apparatus according to the first aspect is typically a management apparatus which manages the operation of the bus or an apparatus which acquires information from the management apparatus and makes a route search.

The information processing apparatus acquires information related to the operation of the bus (operation information). The operation information may be data indicating a bus operation schedule or may be data indicating a track record of the operation of the bus. The pieces of data may include information related to a running route or may include information related to a stop.

The operation information may be acquired from a vehicle-mounted apparatus mounted on the bus or may be acquired from an apparatus or a database which manages the operation of the bus.

The information processing apparatus can generate the running route for the first vehicle on the basis of the operation information of the bus. For example, the first vehicle is preferably a light vehicle, such as a bicycle.

This makes it possible to, for example, guide the first vehicle to a route with a lower possibility of an encounter with a running bus or a stopped bus and enhance running safety of the first vehicle.

Note that the controller may generate a map in which evaluation values related to the operation of the bus are associated with a plurality of road links. Each of the evaluation values may be, for example, a value representing a frequency of passage of the bus or may be a value representing a frequency of stopping of the bus for boarding and alighting of a user.

Note that, at the time of making the route search, the controller may select a plurality of road links with lower frequencies of passage of the bus or lower frequencies of stopping of the bus for the boarding and alighting of the user.

The controller may generate the map on a per-time-slot basis. Use of a map suited to a time slot allows further enhancement of route search precision.

Specific embodiments of the present disclosure will be described below with reference to the drawings. Hardware configurations, module configurations, functional configurations, and the like described in the embodiments are not intended to limit a technical scope of the disclosure only thereto unless otherwise described.

First Embodiment

Figure 1:
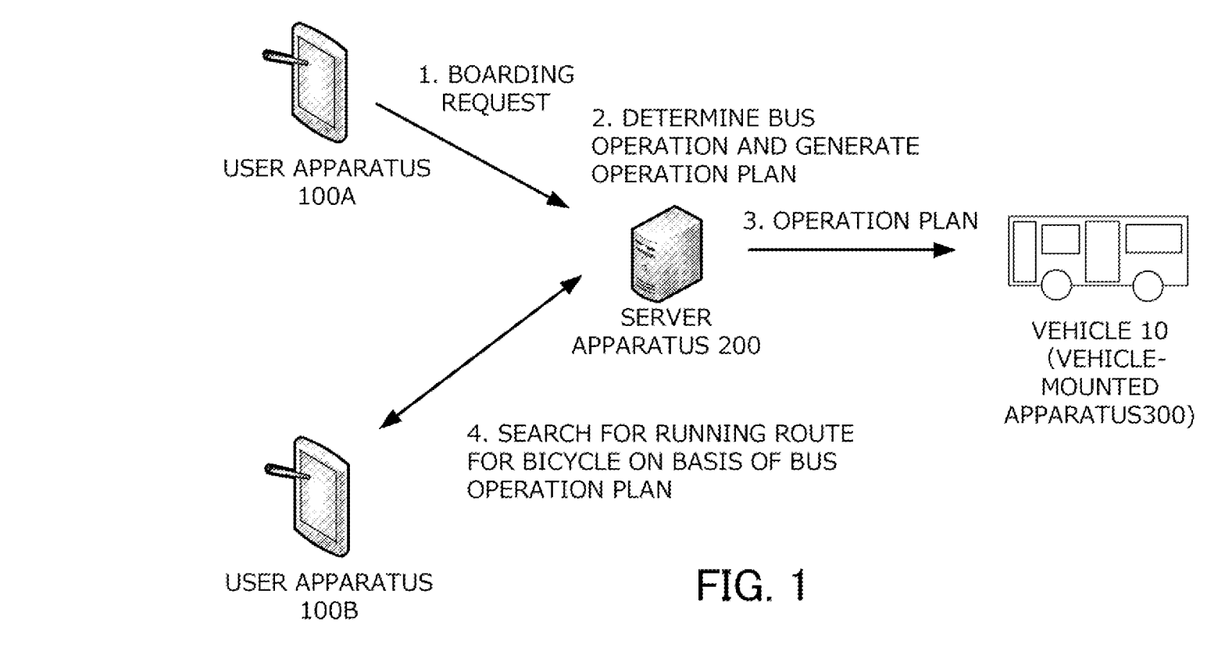
FIG. 1 is a schematic diagram of a route search system according to a first embodiment.

An outline of a route search system according to a first embodiment will be described with reference to FIG. 1. The route search system according to the present embodiment is configured to include a vehicle 10 on which a vehicle-mounted apparatus 300 is mounted, a user apparatus 100, and a server apparatus 200. The number of vehicles 10 (vehicle-mounted apparatuses 300) included in the system may be two or more.

Note that although an apparatus carried by a user who boards an on-demand bus and an apparatus which makes a route search for bicycles are referred to as a user apparatus 100A and a user apparatus 100B, respectively, in the present embodiment, both the apparatuses may be apparatuses having the same configurations. If there is no need to make a distinction between both the apparatuses, the apparatuses are referred to as the user apparatuses 100.

The vehicle 10 is an on-demand bus on which the vehicle-mounted apparatus 300 is mounted. The on-demand bus is a ride-sharing automobile which is operated in response to a boarding request from a user. The vehicle 10 may be a vehicle driven by a crew or may be an autonomous vehicle. The vehicle-mounted apparatus 300 is configured to be capable of wireless communication with the server apparatus 200. In the present specification, the vehicle 10 is referred to as an on-demand bus or simply a bus.

A user who desires to board an on-demand bus transmits a boarding request to the server apparatus 200 via the user apparatus 100A. The boarding request includes, for example, a desired boarding point, a desired boarding time, a desired alighting point, and the like.

The above-described pieces of information can be generated and transmitted by application software for using the route search system which is installed on the user apparatus 100A. Note that the pieces of information need not necessarily be generated using a portable terminal. For example, the pieces of information may be generated using an arbitrary terminal connectable to a network (e.g., a smartphone, a cellular phone, a tablet terminal, a personal information terminal, or a wearable computer) or a personal computer.

The server apparatus 200 generates an operation plan for the on-demand bus on the basis of the boarding request transmitted from the user apparatus 100A. The operation plan is, for example, data including an operation route, a point where the user is allowed to board or alight, an operation schedule, and the like.

The point where the user is allowed to board or alight can be determined by the server apparatus 200. For example, the server apparatus 200 determines a point where the user is allowed to board or alight on the basis of a point where the user desires to board or alight and a road on which the bus can run. If a plurality of users desire to board at a plurality of points adjacent to each other and desire to travel in the same direction, the server apparatus 200 may group the plurality of users and allow the plurality of users to board at a single point.

The server apparatus 200 generates a route passing through points where users board and alight (and a schedule for the passage), generates the operation plan described earlier, and transmits the operation plan to a target vehicle (the vehicle-mounted apparatus 300).

The vehicle-mounted apparatus 300 receives the operation plan from the server apparatus 200. If the bus is a manned vehicle, the operation plan is provided to a crew. If the bus is an unmanned vehicle, the operation plan is transmitted to an apparatus which is mounted on the bus and controls autonomous running.

Additionally, in the present embodiment, the user apparatus 100B transmits a request for making a route search for bicycles to the server apparatus 200. The server apparatus 200 refers to the bus operation plan generated by itself and makes an evaluation of a road link on the basis of how frequently the on-demand bus passes through the road link. The server apparatus 200 makes a route search while giving priority to a road link with a lower bus operation frequency and provides an obtained result to the user apparatus 100B. This makes it possible to guide a bicycle to a safer route.

In the route search system according to the present embodiment, a plurality of user apparatuses 100, the server apparatus 200, and the vehicle-mounted apparatus 300 are connected to each other by a network. For example, a WAN (Wide Area Network) which is a worldwide public communication network, such as the Internet, or any another communication network may be adopted as the network. The network may include a telephone communication network for, e.g., cellular phones, or a wireless communication network, such as Wi-Fi®.

Elements constituting the system will be described.

Figure 2:
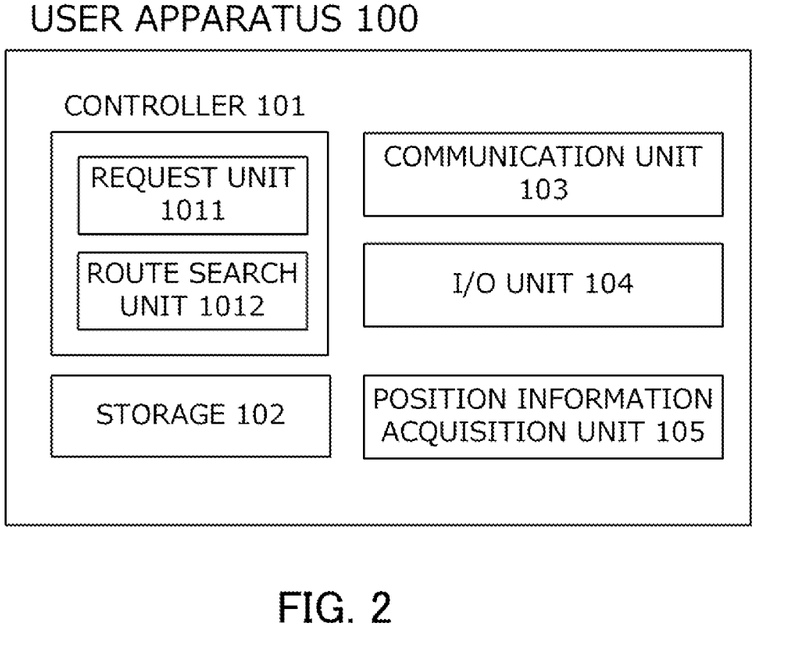
FIG. 2 is a diagram illustrating constituent elements of a user apparatus 100.

FIG. 2 is a diagram illustrating a system configuration of the user apparatus 100.

The user apparatus 100 is, for example, a small computer, such as a smartphone, a cellular phone, a tablet computer, a personal information terminal, a notebook computer, or a wearable computer (e.g., a smartwatch). The user apparatus 100 is configured to include a controller 101, a storage 102, a communication unit 103, an I/O unit 104, and a position information acquisition unit 105.

The controller 101 is an arithmetic device which is responsible for control to be performed by the user apparatus 100. The controller 101 can be implemented by an arithmetic processing device, such as a CPU (Central Processing Unit).

The controller 101 is configured to have two types of functional modules of a request unit 1011 and a route search unit 1012. The functional modules may be implemented through execution of a program stored in the storage 102 (to be described later) by the CPU.

Figure 3:
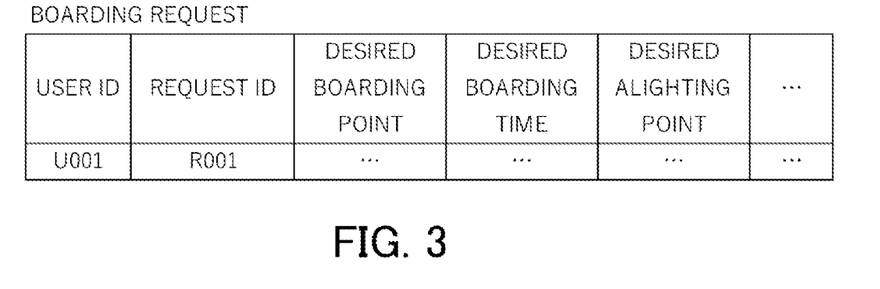
FIG. 3 is an example of a boarding request transmitted from the user apparatus 100.

The request unit 1011 acquires information needed to make a boarding reservation for an on-demand bus from a user of the apparatus and transmits a boarding request to the server apparatus 200. Specifically, the request unit 1011 acquires an identifier of the user, a desired boarding point, a desired boarding time, a desired alighting point, and the like via the I/O unit 104 (to be described later). The acquired pieces of information are transmitted as the boarding request to the server apparatus 200. FIG. 3 is an example of a boarding request generated by the request unit 1011. The request unit 1011 also performs a process of confirming the boarding reservation by dialoging with the server apparatus 200.

The route search unit 1012 acquires information needed to make a route search for bicycles from the user of the apparatus and transmits a request for making the route search (hereinafter referred to as a route search request) to the server apparatus 200. Specifically, the route search unit 1012 acquires a departure place, a destination, and the like via the I/O unit 104 (to be described later), generates a route search request including the pieces of information, and transmits the route search request to the server apparatus 200. The route search unit 1012 also performs a process of receiving a route generated by the server apparatus 200 from the server apparatus 200 and outputting the route.

The storage 102 is configured to include a main memory and an auxiliary memory. The main memory is a memory into which a program to be executed by the controller 101 and data to be used by the control program are loaded. The auxiliary memory is a device in which the program to be executed in the controller 101 and the data to be used by the control program are stored. A thing obtained by packaging the program to be executed by the controller 101 as an application may be stored in the auxiliary memory. An operating system for executing such applications may be stored. The program stored in the auxiliary memory is loaded into the main memory and is executed by the controller 101, thereby performing the processes to be described below.

The main memory may include a RAM (Random Access Memory) or a ROM (Read Only Memory). The auxiliary memory may include an EPROM (Erasable Programmable ROM) or a hard disk drive (HDD). Additionally, the auxiliary memory may include a removable medium, i.e., a removable recording medium. The removable medium is, for example, a USB (Universal Serial Bus) memory or a disc recording medium, such as a CD (Compact Disc) or a DVD (Digital Versatile Disc).

The communication unit 103 is a wireless communication interface for connecting the user apparatus 100 to the network. The communication unit 103 provides access to the network via, for example, a wireless LAN or a mobile communication service, such as 3G or LTE.

The I/O unit 104 is a unit for accepting an input manipulation performed by the user of the apparatus and presenting information. In the present embodiment, the I/O unit 104 is made up of one touch panel display. That is, the I/O unit 104 is composed of a liquid crystal display and a control unit therefor and a touch panel and a control unit therefor.

Note that although the user apparatus 100A and the user apparatus 100B are assumed to have the same configurations in the present embodiment, both the apparatuses may be separate apparatuses. That is, an apparatus which makes a request to be allowed to board an on-demand bus and an apparatus which makes a route search may be separately provided.

A configuration of the server apparatus 200 will be described.

The server apparatus 200 can be configured as a computer having a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory, and functions tailored to a predetermined purpose as will be described later can be implemented through execution of a program stored therein. Note that some or all functions may be implemented by a hardware circuit, such as an ASIC or an FPGA. Note that the server apparatus 200 may be composed of a single computer or may be composed of a plurality of computers which collaborate with each other.

Figure 4:
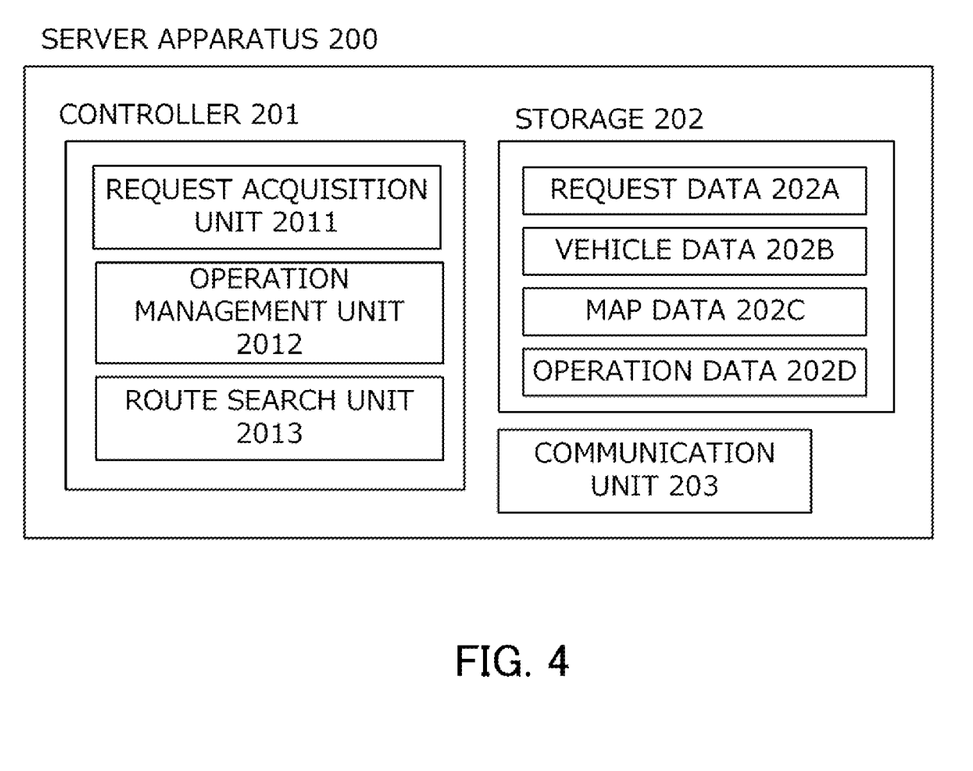
FIG. 4 is a diagram illustrating constituent elements of a server apparatus 200.

FIG. 4 is a diagram illustrating a system configuration of the server apparatus 200. The server apparatus 200 is configured to include a controller 201, a storage 202, and a communication unit 203.

The controller 201 is an arithmetic device responsible for control to be performed by the server apparatus 200. The controller 201 can be implemented by an arithmetic processing device, such as a CPU.

The controller 201 is configured to have three types of functional modules of a request acquisition unit 2011, an operation management unit 2012, and a route search unit 2013. The functional modules may be implemented through execution of a program stored in the auxiliary memory by the CPU.

The request acquisition unit 2011 acquires a boarding request transmitted from the user apparatus 100 and causes the storage 202 to temporarily store the boarding request as request data 202A. The boarding request acquired and stored is used by the operation management unit 2012.

The operation management unit 2012 gives various types of commands related to operation of an on-demand bus.

Specifically, first, the operation management unit 2012 acquires data related to bus operation and the vehicle (hereinafter referred to as vehicle data) from each of a plurality of vehicles 10 (vehicle-mounted apparatuses 300) and causes storage. This allows the server apparatus 200 to know current positions and statuses of the plurality of vehicles 10.

Second, the operation management unit 2012 generates a bus operation plan on the basis of a plurality of boarding requests collected from the plurality of user apparatuses 100. The operation plan includes an operation route for the bus, an operation schedule, information on a user allowed to board, and the like. The operation route and the operation schedule for the bus are generated on the basis of the users' desires included in the plurality of boarding requests. The generated operation plan is stored as operation data 202D and is transmitted to the target vehicle 10 (vehicle-mounted apparatus 300).

The route search unit 2013 searches for a route suitable for running of bicycles. Specifically, the route search unit 2013 generates a route connecting a departure place and a destination in response to a route search request received from the user apparatus 100 and provides the route to the user apparatus 100. The route search unit 2013 generates the route connecting the departure place and the destination on the basis of cost indicators (e.g., a distance and passage time) assigned to a plurality of road links, as in a normal route search.

Additionally, the route search unit 2013 makes a route search using a low frequency of passage of an on-demand bus as one of the cost indicators. That is, the route search unit 2013 searches for a route which preferentially passes through road links with lower frequencies of passage of the on-demand bus.

For this reason, the route search unit 2013 executes a process of calculating an evaluation value representing how frequently the on-demand bus passes through a target road link on the basis of the operation data 202D and associating respective evaluation values with a plurality of road links, prior to the route search.

With the above-described configuration, a route on which bicycles can run more safely can be determined.

The storage 202 is configured to include a main memory and an auxiliary memory. The main memory is a memory into which a program to be executed by the controller 201 and data to be used by the control program are loaded. The auxiliary memory is a device in which the program to be executed in the controller 201 and the data to be used by the control program are stored.

The request data 202A, vehicle data 202B, map data 202C, and the operation data 202D are stored in the storage 202.

The request data 202A is a collection of boarding requests received from the plurality of user apparatuses 100, as illustrated in FIG. 3.

The vehicle data 202B is a collection of a plurality of pieces of vehicle data transmitted from the vehicle-mounted apparatuses 300.

Figure 5:
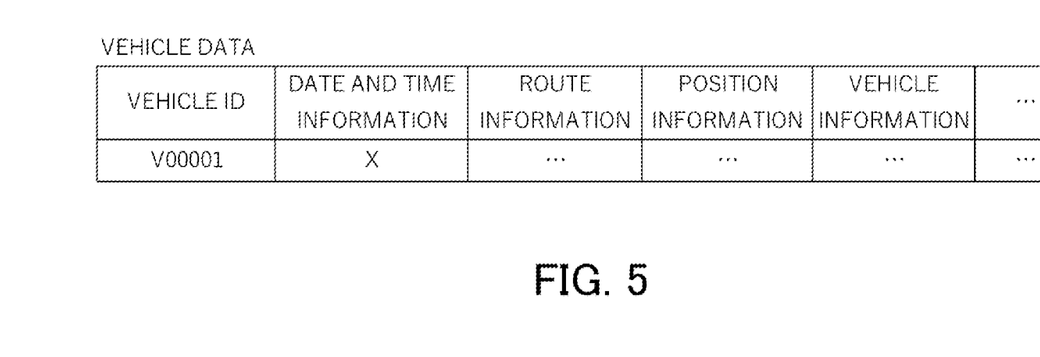
FIG. 5 is an example of vehicle data 202B.

FIG. 5 is an example of vehicle data. Respective fields for a vehicle ID, date and time information, route information, position information, and vehicle information are included in the vehicle data. An identifier for unique identification of a vehicle is stored in the vehicle ID field. A date and time of generation of the vehicle data is stored in the date and time field.

Information related to an operation route for a bus is stored in the route information field.

A section in which the bus is currently running is stored in the position information field. Position information may be represented by, for example, latitude and longitude or may be represented by an identifier of a stop. The position information may be, for example, the information "Running between Stop X1 and Stop X2."

The position information may be acquired via, for example, a GPS module which the bus (vehicle 10) has or may be acquired from the operation-related instrument described earlier. For example, the section, in which the bus is running, may be identified on the basis of data acquired from the operation-related instrument.

Vehicle-related information of the on-demand bus is stored in the vehicle information field. The vehicle-related information may be, for example, information related to the type of the bus (e.g., a low-floor bus) and equipment (e.g., a space for a wheelchair or a slope for a wheelchair) which the bus has.

Note that the stored vehicle data 202B may be deleted at a predetermined timing (e.g., a timing after a lapse of a predetermined time period since reception).

The map data 202C is road map data represented by a collection of road links. Information, such as a distance, passage time, or a traffic volume, may be associated with each of the plurality of road links. Additionally, the map data 202C may be data in which a real-time traffic situation is reflected. The real-time traffic situation may be cyclically updated on the basis of, for example, data cyclically acquired from an external apparatus.

The operation data 202D is a collection of bus operation plans, each of which is generated on the basis of a plurality of boarding requests by the operation management unit 2012.

Figure 6:
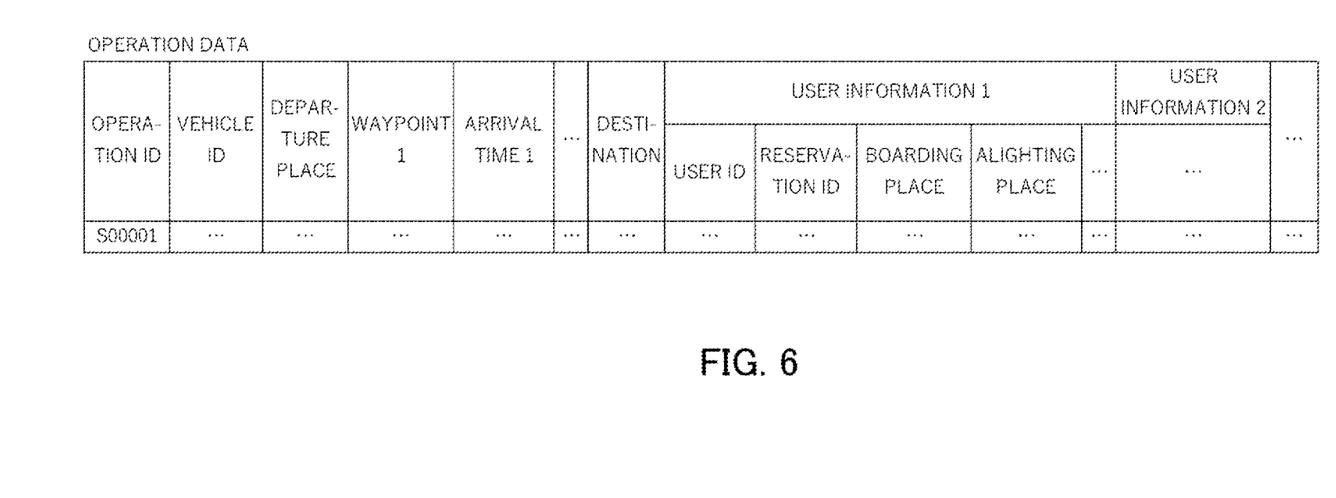
FIG. 6 is an example of operation data 202D.

FIG. 6 is an example of the operation data 202D. As illustrated, an identifier (operation ID) for unique identification of an operation, an identifier (vehicle ID) of a vehicle, points through which a bus is to pass, passage times for the points, information (user information) related to a user who is to board, and the like are included in the operation data 202D. An identifier of the user, an identifier of a boarding reservation, a boarding point, an alighting point, and the like are included in the user information.

Note that the operation data 202D may be data including only an operation plan in the future or may be data including a track record of past operation.

The communication unit 203 is a communication interface for connecting the server apparatus 200 to the network. The communication unit 203 is configured to include, for example, a network interface board or a wireless communication circuit for wireless communication.

Functions provided by the route search unit 2013 will be described in more detail.

The route search unit 2013 generates a route suitable for bicycles on the basis of a route search request received from the user apparatus 100.

First, the route search unit 2013 gives an evaluation value for each of a plurality of road links on the basis of the operation data 202D. In the present embodiment, the evaluation value is a value associated with a running frequency of an on-demand bus. For example, the lower a frequency of passage of the bus through a given road link during a predetermined past period is, a higher evaluation value is given to the road link.

Giving of an evaluation value is performed for each of all road links in predetermined cycles.

Second, the route search unit 2013 treats the evaluation values given to the plurality of road links as one of the cost indicators and makes a route search. Generally, a route search is executed using the length of a required time period and a distance as cost indicators. In the present embodiment, the route search unit 2013 uses the given evaluation values as one of the cost indicators in addition to these. This makes it possible to generate a collection of road links with lower frequencies of running of an on-demand bus.

A configuration of the vehicle-mounted apparatus 300 will be described.

The vehicle-mounted apparatus 300 is a computer which is mounted on an on-demand bus (the vehicle 10). The vehicle-mounted apparatus 300 exchanges operation-related information by communicating with the server apparatus 200.

The vehicle-mounted apparatus 300 may double as an apparatus which provides information to a bus crew or a passenger. For example, the vehicle-mounted apparatus 300 may be an instrument which gives guidance to a passenger (hereinafter referred to as an operation-related instrument). Examples of the operation-related instrument include an instrument which controls a destination indicator or a broadcasting apparatus which the bus has.

The vehicle-mounted apparatus 300 may be an electronic control unit (ECU) which a vehicle platform has. Alternatively, the vehicle-mounted apparatus 300 may be a data communication module (DCM) having a communication function.

The vehicle-mounted apparatus 300 has a function of communicating wirelessly with an external network. The vehicle-mounted apparatus 300 may have a function of downloading traffic information, road map data, and the like by communicating with the external network.

The vehicle-mounted apparatus 300 can be configured as a computer having a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory, and functions tailored to a predetermined purpose as will be described later can be implemented through execution of a program stored therein. Note that some or all functions may be implemented by a hardware circuit, such as an ASIC or an FPGA.

Figure 7:
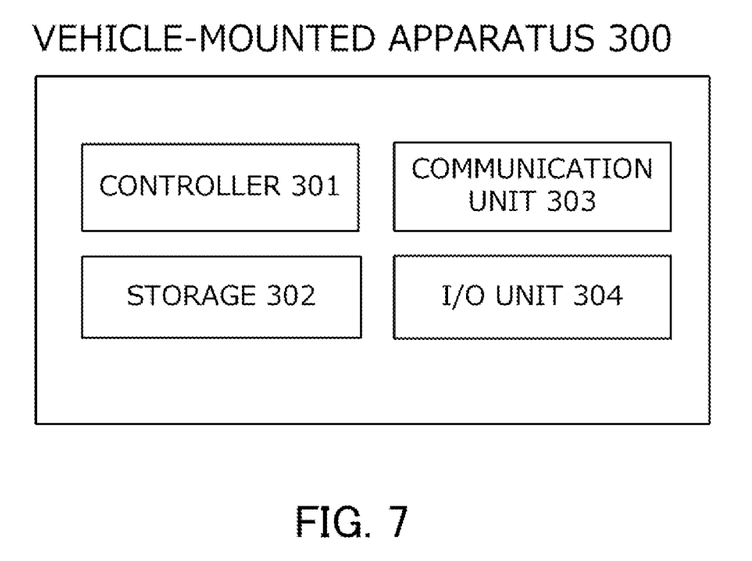
FIG. 7 is a diagram illustrating constituent elements of a vehicle-mounted apparatus 300.

FIG. 7 is a diagram illustrating in detail constituent elements of the vehicle-mounted apparatus 300 to be mounted on a bus (the vehicle 10).

The vehicle-mounted apparatus 300 is configured to have a controller 301, a storage 302, a communication unit 303, and an I/O unit 304.

The controller 301 is an arithmetic unit which implements various types of functions of the vehicle-mounted apparatus 300 by executing a predetermined program. The controller 301 may be implemented by, for example, a CPU or the like. The controller 301 may implement the functions through execution of a stored program by the CPU.

The controller 301 acquires or generates data (vehicle data) related to bus operation and the vehicle 10 at a predetermined timing and transmits the data to the server apparatus 200. The vehicle data includes, for example, route information (an intended operation route), position information (a current running position), vehicle information, and the like.

The storage 302 is a unit for storing information and is composed of a storage medium, such as a RAM, a magnetic disk, or a flash memory. Various types of programs to be executed in the controller 301, data to be used by the programs, and the like are stored in the storage 302.

The communication unit 303 includes an antenna and a communication module for wireless communication. The antenna is an antenna element which inputs and outputs a wireless signal. In the present embodiment, the antenna is suited to mobile communication (mobile communication, such as 3G, LTE, or 5G). Note that the antenna may be configured to include a plurality of physical antennas. For example, if mobile communication using radio waves in a high-frequency band, such as microwaves or milliwaves, is performed, a plurality of antennas may be dispersedly arranged to achieve communication stabilization. The communication module is a module for performing mobile communication.

The I/O unit 304 is a unit for accepting an input manipulation and presenting information. In the present embodiment, the I/O unit 304 is composed of one touch panel display. That is, the I/O unit 304 is composed of a liquid crystal display and a control unit therefor and a touch panel and a control unit therefor.

Note that the configurations illustrated in FIGS. 2, 4, and 7 are examples and that all or some of the illustrated functions may be executed using a specifically designed circuit. Program storage or execution may be performed by a combination of a main memory and an auxiliary memory other than the illustrated ones.

Processes to be executed by the apparatuses will be described.

Figure 8:
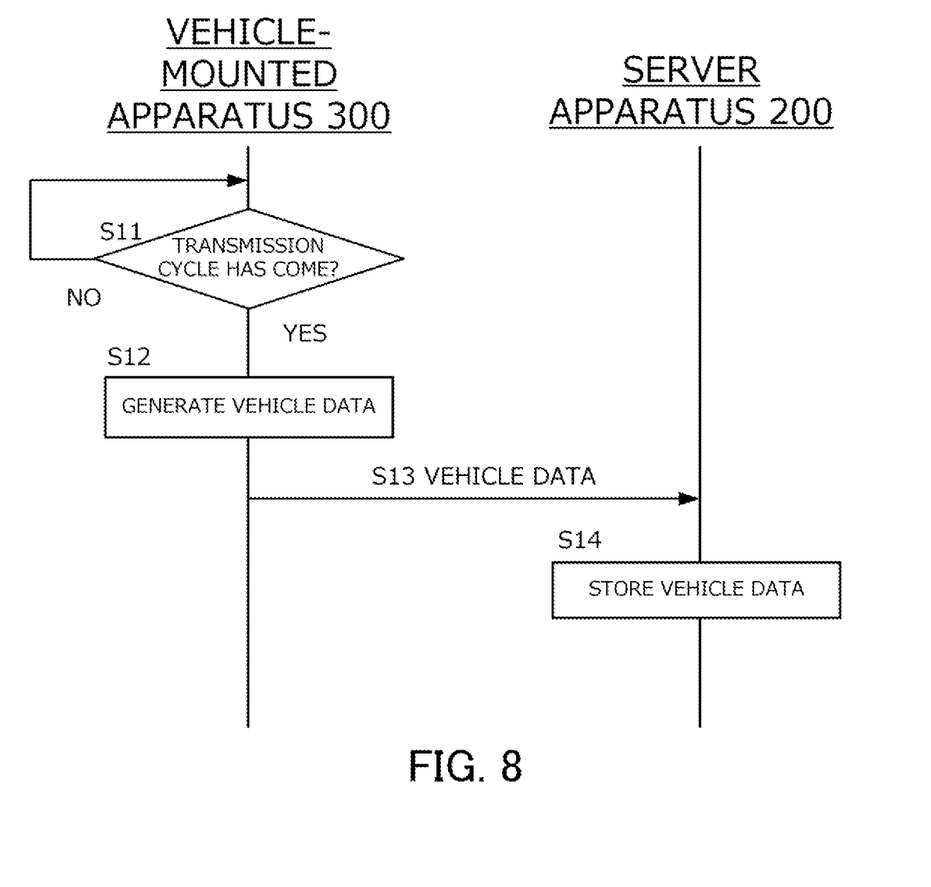
FIG. 8 is a sequence chart of a process of transmitting and receiving vehicle data.

FIG. 8 is a sequence chart of a process of transmitting and receiving vehicle data by the vehicle-mounted apparatus 300 and the server apparatus 200. The illustrated process is repeatedly executed in predetermined cycles by the controller 301 while the vehicle 10 is running.

First, in step S11, the vehicle-mounted apparatus 300 determines whether a predetermined transmission cycle has come. When a predetermined cycle (of, e.g., one minute) begins, the process shifts to step S12. If a predetermined cycle has not come, the vehicle-mounted apparatus 300 waits for a predetermined time period and repeats the process.

In step S12, the vehicle-mounted apparatus 300 generates vehicle data. The generated vehicle data is transmitted to the server apparatus 200 in step S13.

In step S14, the server apparatus 200 (operation management unit 2012) receives the vehicle data transmitted from the vehicle-mounted apparatus 300 and stores the vehicle data in the storage 202.

In this manner, pieces of vehicle data received from a plurality of vehicles 10 are accumulated in the storage 202 of the server apparatus 200 as needed.

Figure 9:
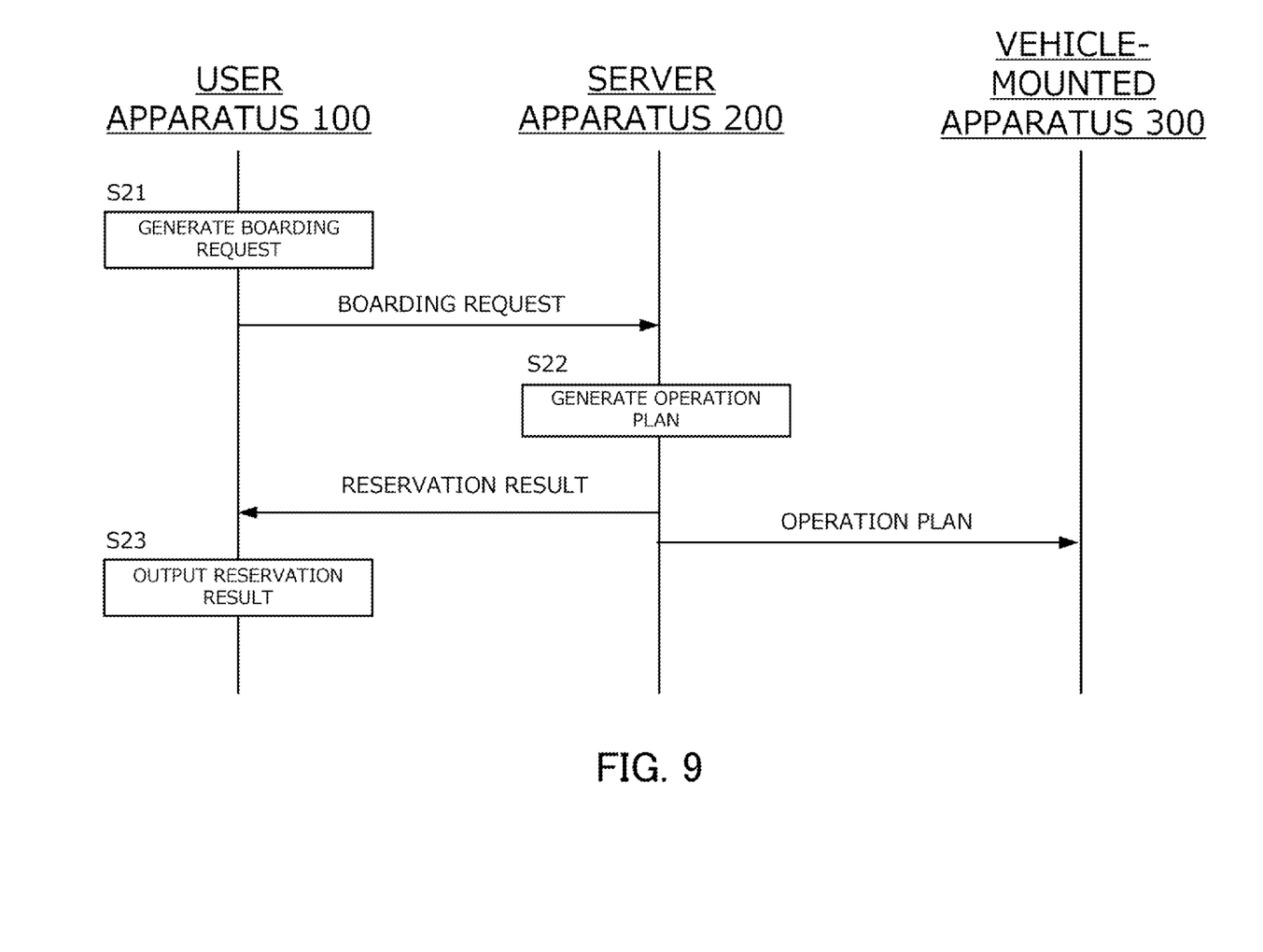
FIG. 9 is a sequence chart of a process of making a boarding reservation.

FIG. 9 is a sequence chart of a process of having interaction and accepting a boarding reservation by the apparatuses included in the system. The illustrated process is started on the basis of a user's manipulation.

First, in step S21, the user apparatus 100 (request unit 1011) generates a boarding request. In the present step, a user is made to input a desired boarding point, a desired alighting point, a desired boarding time, and the like via a predetermined interface. The request unit 1011 transmits the generated boarding request to the server apparatus 200 (request acquisition unit 2011).

The boarding request acquired by the server apparatus 200 is accumulated in the server apparatus 200 until a predetermined trigger is pulled. The trigger may be cyclically pulled (at intervals of, e.g., 10 minutes) or may be pulled at a set time.

When the predetermined trigger is pulled, a process in step S22 is started.

In step S22, the operation management unit 2012 selects the vehicle 10 and determines an operation route and an operation schedule for the vehicle 10 on the basis of a plurality of boarding requests in accordance with a predetermined rule, and generates an operation plan including the operation route and the operation schedule. The selection of the vehicle 10 can be performed on the basis of, for example, accumulated vehicle data.

When the operation plan is generated, the operation management unit 2012 generates information for giving notification of a reservation result and transmits the information to the user apparatus 100, and the request unit 1011 outputs the information (step S13). The information for giving notification of the reservation result includes, for example, information related to a boarding point, a boarding time, and an alighting point. This allows the user to check that the boarding reservation is established.

The operation management unit 2012 transmits the generated operation plan to the vehicle-mounted apparatus 300 mounted on the target vehicle 10.

Figure 10:
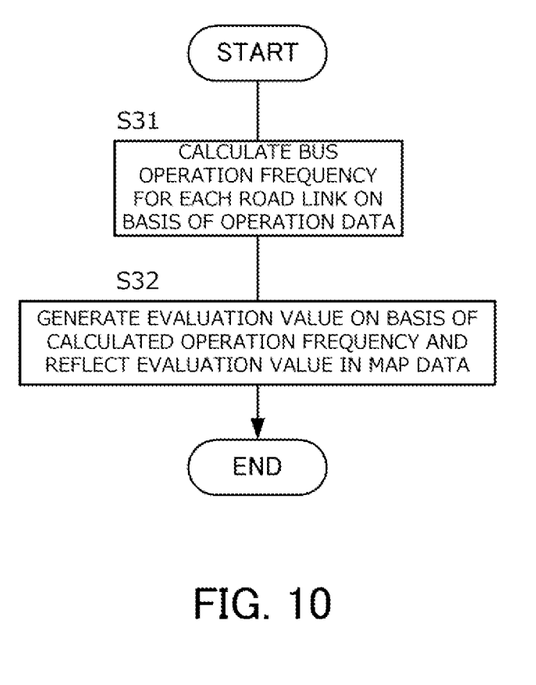
FIG. 10 is a flowchart of a process of calculating an evaluation value for each road link.

A process of giving evaluation values to a plurality of road links on the basis of an operation plan for an on-demand bus by the server apparatus 200 will be described. FIG. 10 is a flowchart of the process of giving evaluation values to the plurality of road links by the server apparatus 200 (route search unit 2013). The illustrated process is cyclically executed at a predetermined timing.

First, in step S31, an operation frequency of the on-demand bus is calculated for each of the plurality of road links defined in the map data 202C on the basis of the operation data 202D stored in the storage 202. The operation frequency may be, for example, the sum of the numbers of passages of the bus during a predetermined period (e.g., one week) or may be an average value of the numbers of passages of the bus (e.g., the average number of passages per day).

In next step S32, an evaluation value is generated on the basis of each calculated operation frequency, the evaluation value is associated with a corresponding road link, and a result of the association is reflected in the map data 202C. The evaluation value may be a value itself calculated in step S31 or may be a result (e.g., a high frequency, an intermediate frequency, or a low frequency) of making a classification on the basis of the value calculated in step S31.

Note that, if an evaluation value is already given to a road link, the route search unit 2013 may overwrite the evaluation value with the result or may take an arithmetic average or the like of the result and the evaluation value given in the past and overwrite the evaluation value with a result of taking the arithmetic average.

A process of making a route search for bicycles on the basis of a request from the user apparatus 100 by the server apparatus 200 will be described.

Figure 11:
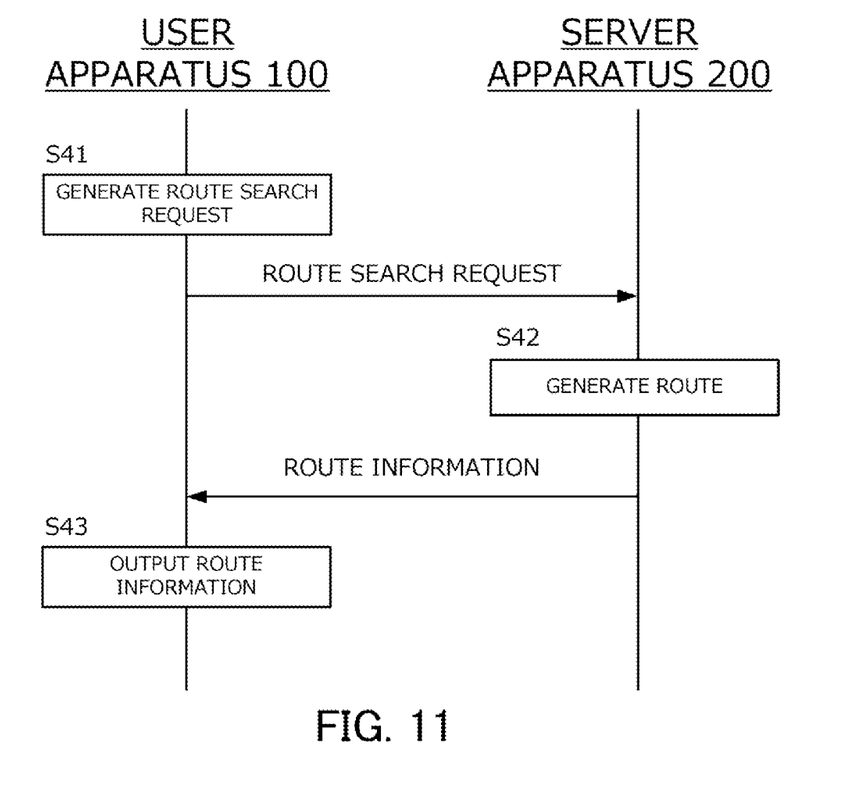
FIG. 11 is a sequence chart of a process of making a route search.

FIG. 11 is a sequence chart of a process of having interaction and making a route search suitable for bicycles by the user apparatus 100 and the server apparatus 200. The illustrated process is started on the basis of a user's manipulation.

First, in step S41, the user apparatus 100 generates a route search request. In the present step, the route search unit 1012 acquires a departure place and a destination from the user of the apparatus and generates a route search request including these. The generated route search request is transmitted to the server apparatus 200 (route search unit 2013).

In step S42, the server apparatus 200 (route search unit 2013) searches for a route connecting the departure place and the destination included in the route search request. The route search unit 2013 searches for a route connecting the departure place and the destination on the basis of cost indicators (e.g., a distance and passage time) assigned to a plurality of road links. Additionally, the route search unit 2013 makes a route search using a low frequency of passage of an on-demand bus as one of the cost indicators. With this configuration, for example, road links indicating lower passage frequencies are preferentially searched for.

Route information obtained in step S42 is transmitted to the user apparatus 100 and is output in step S43. This allows the user of the user apparatus 100 to obtain a route suitable for running of bicycles.

As has been described above, in the route search system according to the first embodiment, the server apparatus 200 determines a bus running frequency for each road link on the basis of information related to operation of an on-demand bus. The server apparatus 200 then generates a route obtained by preferentially selecting road links with lower running frequencies of the on-demand bus on the basis of evaluation values generated on the basis of running frequencies. This allows generation of a route safer for bicycles to run.

(Modification of First Embodiment)

In the first embodiment, a running frequency of an on-demand bus in each road link is determined on the basis of an operation plan generated by the server apparatus 200. However, the running frequency may be determined on the basis of data (vehicle data) collected from the vehicle 10 (vehicle-mounted apparatus 300). Since a timestamp and position information of the vehicle 10 are included in the vehicle data, a road link on which the vehicle 10 has run can be identified by referring to the vehicle data in step S31.

Second Embodiment

Although a route search is made on the basis of a running frequency of an on-demand bus in the first embodiment, a criterion for making a route search may be one other than this.

A server apparatus 200 can know a position of a stop at which an on-demand bus stops, a dwell time at the stop, the number of users boarding and alighting at the stop, and the like on the basis of operation data 202D.

For the above-described reason, values as described below may be calculated in step S21 of the first embodiment, and an evaluation value may be generated on the basis of the values in step S22:

(1) A frequency of stopping of a vehicle 10 for boarding and alighting of users (the numbers of stops during a predetermined period or an average value of the numbers of stops) in a road link (2) The dwell time at a stop (the sum of the dwell times during a predetermined period or an average value of the dwell times)

(3) The number of people boarding and alighting at a stop (the sum of the numbers of people boarding and alighting during a predetermined period or an average value of the numbers of people boarding and alighting)

In the second embodiment, a route search is made on the basis of an evaluation value obtained in the above-described manner. Specifically, a route search is made while priority is given to a road link with a lower frequency of stopping of the vehicle 10 for boarding and alighting of users, a road link with shorter dwell times, or a road link with a smaller number of people boarding and alighting. This makes it possible to extract a road link easy for bicycles to run on.

Note that although the above-described three examples have been given as evaluation criteria in the present embodiment, the criteria may be combined or the first embodiment (i.e., a mode in which an operation frequency is used as an evaluation value) may be combined with the evaluation criteria.

Third Embodiment

In the first and second embodiments, an evaluation value for each road link is calculated on the basis of a track record of operation of an on-demand bus during a predetermined period. A demand for an on-demand bus may fluctuate according to the time slot or the day of the week. For this reason, if a route search is made in a particular time slot or on a particular day of the week, an evaluation value may be calculated using operation data corresponding to the time slot or the day of the week.

In the third embodiment, in step S21, a time slot and/or a day of the week, for which a route search is to be made, is specified. The time slot and the day of the week may correspond to a timing when a route search is made or may be ones designated by a user.

The time slot may be, for example, one obtained by dividing time into predetermined time intervals (of, e.g., 30 minutes). The day of the week may be any one of Sunday to Saturday or a time division, such as a weekday, a weekend, a holiday, a day before a holiday, or a national holiday (public holiday).

Operation data corresponding to the specified time slot and/or the specified day of the week is extracted, and a bus operation frequency or the like is calculated.

As described above, since a route search can be made for each time slot or each day of the week in the third embodiment, an operation frequency of an on-demand bus or the like can be determined with high precision.

(Modifications)

The above-described embodiments are merely examples, and the present disclosure can be appropriately changed and carried out without departing from the spirit thereof.

For example, the processes and means described in the present disclosure can be freely combined and carried out as long as there is no technical contradiction.

Although an apparatus (operation management apparatus) which manages operation of an on-demand bus is given as an example of the server apparatus 200 in the description of the embodiments, the server apparatus 200 may be an apparatus which acquires information from such an operation management apparatus and makes a route search.

Although an on-demand bus is given as an example of the vehicle 10 in the description of the embodiments, the vehicle 10 may be a fixed-route bus for which an operation route and an operation schedule are fixed.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a Floppy® disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. A route search system comprising:
   a user apparatus owned by a user of a first vehicle, which is a light vehicle, the user apparatus including a processor and a wireless communication interface; and
   an information processing apparatus including a controller configured to execute:
      acquiring operation information that is information related to operation of a bus, the operation information including road links on which the bus runs;
      calculating evaluation values for each of the road links on which the bus runs based on the operation information that has been acquired, each of the evaluation values having a magnitude that depends on a frequency of passage of the bus through a corresponding one of the road links associated with the evaluation value;
      generating a map in which the evaluation values that have been calculated are associated with the road links in the map;
      in response to receipt of a running route request transmitted via the wireless communication interface of the user apparatus, generating a running route for guiding the first vehicle from a departure place to a destination that are identified in the running route request, the controller generating the running route based on the map that has been generated, the running route connecting the departure place to the destination and passing through the road links having evaluation values that are indicative of a lower frequency of passage of the bus; and
      transmitting the running route that has been generated to the user apparatus via the wireless communication interface of the user apparatus, wherein
   the user of the first vehicle outputs the running route on the user apparatus to guide the first vehicle on the running route from the departure place to the destination.

2. The route search system according to claim 1, wherein the operation information includes pieces of position information cyclically acquired from a plurality of buses, and
   the controller of the information processing apparatus calculates the respective evaluation values for the road links on the basis of the pieces of position information.

3. The route search system according to claim 1, wherein the controller of the information processing apparatus generates the running route by selecting a plurality of road links with lower frequencies of passage of the bus.

4. The route search system according to claim 1, wherein each of the evaluation values is a value related to a frequency of stopping of the bus for boarding and alighting of a user in a corresponding one of the road links.

5. The route search system according to claim 4, wherein the operation information includes information related to a dynamically set stop of the bus, and
   the controller of the information processing apparatus calculates the respective evaluation values for the road links on the basis of the information related to the stop.

6. The route search system according to claim 4, wherein the controller of the information processing apparatus generates the running route by selecting a plurality of road links with lower frequencies of stopping of the bus for the boarding and alighting of the user.

7. The route search system according to claim 1, wherein the controller of the information processing apparatus generates the map on a per-time-slot basis.

8. A route search method comprising:
   a controller of an information processing apparatus acquiring operation information that is information related to operation of a bus, the operation information including road links on which the bus runs;
   calculating, by the controller, evaluation values for each of the road links on which the bus runs based on the operation information that has been acquired, each of the evaluation values having a magnitude that depends on a frequency of passage of the bus through a corresponding one of the road links associated with the evaluation value;
   generating, by the controller, a map in which the evaluation values that have been calculated are associated with the road links in the map;
   in response to receipt of a running route request transmitted to the controller via a wireless communication interface of a user apparatus owned by a user of a first vehicle, which is a light vehicle, the user apparatus including a processor and the wireless communication interface, the controller generating a running route for guiding the first vehicle from a departure place to a destination that are identified in the running route request, the controller generating the running route based on the map that has been generated, the running route connecting the departure place to the destination and passing through the road links having evaluation values that are indicative of a lower frequency of passage of the bus; and transmitting the running route that has been generated to the user apparatus via the wireless communication interface of the user apparatus, wherein the user of the first vehicle outputs the running route on the user apparatus to guide the first vehicle on the running route from the departure place to the destination.

9. The route search method according to claim 8, wherein the operation information includes pieces of position information cyclically acquired from a plurality of buses, and the calculating includes calculating the respective evaluation values for the road links on the basis of the pieces of position information.

10. The route search method according to claim 8, wherein the generating includes generating the running route by selecting a plurality of road links with lower frequencies of passage of the bus.

11. The route search method according to claim 8, wherein each of the evaluation values is a value related to a frequency of stopping of the bus for boarding and alighting of a user in a corresponding one of the road links.

12. The route search method acording to claim 11, wherein the operation information includes information related to a dynamically set stop of the bus, and the calculating includes calculating the respective evaluation values for the road links on the basis of the information related to the stop.

13. The route search method acording to claim 11, wherein the generating includes generating the running route by selecting a plurality of road links with lower frequencies of stopping of the bus for the boarding and alighting of the user.

14. The route search method according to claim 8, wherein the generating includes generating the map on a per-time-slot basis.

* * * * *